(12) United States Patent
Salsbury et al.

(10) Patent No.: US 8,325,637 B2
(45) Date of Patent: Dec. 4, 2012

(54) PAIRING WIRELESS DEVICES OF A NETWORK USING RELATIVE GAIN ARRAYS

(75) Inventors: Timothy I. Salsbury, Whitefish Bay, WI (US); James S. Botic, New Berlin, WI (US)

(73) Assignee: Johnson Controls Technology Company, Holland, MI (US)

( * ) Notice: Subject to any disclaimer, the term of this patent is extended or adjusted under 35 U.S.C. 154(b) by 1163 days.

(21) Appl. No.: 12/181,253

(22) Filed: Jul. 28, 2008

(65) Prior Publication Data

US 2009/0033513 A1 Feb. 5, 2009

Related U.S. Application Data

(60) Provisional application No. 60/962,697, filed on Jul. 31, 2007.

(51) Int. Cl.
- H04B 7/00 (2006.01)
- H04L 12/26 (2006.01)
- H04W 4/00 (2009.01)

(52) U.S. Cl. ........ 370/310; 370/252; 370/253; 370/332; 370/333; 370/328

(58) Field of Classification Search .................. 370/252, 370/253, 332, 333, 328, 310
See application file for complete search history.

(56) References Cited

U.S. PATENT DOCUMENTS

| | | |
|---|---|---|
| 4,864,519 A | 9/1989 | Appleby et al. |
| 4,916,460 A | 4/1990 | Powell |
| 5,039,995 A | 8/1991 | Hulbert |
| 5,156,203 A | 10/1992 | Funakoshi et al. |
| 5,178,191 A | 1/1993 | Schaefer |
| 5,218,356 A | 6/1993 | Knapp |
| 5,224,648 A | 7/1993 | Simon et al. |
| 5,316,073 A | 5/1994 | Klaus et al. |
| 5,355,305 A | 10/1994 | Seem et al. |
| 5,379,455 A | 1/1995 | Koschek |
| 5,414,640 A | 5/1995 | Seem |
| 5,506,768 A | 4/1996 | Seem et al. |
| 5,550,752 A | 8/1996 | Federspiel |

(Continued)

FOREIGN PATENT DOCUMENTS

AU 660906 7/1995

(Continued)

OTHER PUBLICATIONS

Office Action for U.S. Appl. No. 12/181,235 dated Apr. 4, 2011, 9 pages.

(Continued)

Primary Examiner — Brian Zimmerman
Assistant Examiner — Omeed Alizada
(74) Attorney, Agent, or Firm — Foley & Lardner LLP

(57) ABSTRACT

A method for pairing a first wireless device with a second wireless device includes gathering a first wireless communications characteristic about communications between the first wireless device and the second wireless device. The method further includes gathering second wireless communications characteristics about communications between the first wireless device and at least one wireless device other than the second wireless device. The method further includes generating a matrix using the first and second wireless communications characteristics and generating a relative gain array from the matrix and computing the pairing between the first wireless device and the second wireless device using the generated relative gain array. The method further includes configuring the first wireless device and/or the second wireless device based on the computed pairing.

20 Claims, 7 Drawing Sheets

U.S. PATENT DOCUMENTS

| | | |
|---|---|---|
| 5,555,195 A | 9/1996 | Jensen et al. |
| 5,555,196 A | 9/1996 | Asano |
| 5,568,377 A | 10/1996 | Seem et al. |
| 5,590,830 A | 1/1997 | Kettler et al. |
| 5,682,329 A | 10/1997 | Seem et al. |
| RE35,736 E | 2/1998 | Powell |
| 5,737,318 A | 4/1998 | Melnik |
| 5,762,265 A | 6/1998 | Kitamura et al. |
| 5,769,315 A | 6/1998 | Drees |
| 5,791,408 A | 8/1998 | Seem |
| 5,867,384 A | 2/1999 | Drees et al. |
| 6,006,142 A | 12/1999 | Seem et al. |
| 6,014,546 A | 1/2000 | Georges et al. |
| 6,033,302 A | 3/2000 | Ahmed et al. |
| 6,095,426 A | 8/2000 | Ahmed et al. |
| 6,122,605 A | 9/2000 | Drees et al. |
| 6,219,590 B1 | 4/2001 | Bernaden, III et al. |
| 6,219,950 B1 | 4/2001 | Hsu |
| 6,223,544 B1 | 5/2001 | Seem |
| 6,265,843 B1 | 7/2001 | West et al. |
| 6,296,193 B1 | 10/2001 | West et al. |
| 6,353,853 B1 | 3/2002 | Gravlin |
| 6,369,716 B1 | 4/2002 | Abbas et al. |
| 6,389,331 B1 | 5/2002 | Jensen et al. |
| 6,408,228 B1 | 6/2002 | Seem et al. |
| 6,415,617 B1 | 7/2002 | Seem |
| 6,437,692 B1 | 8/2002 | Petite et al. |
| 6,477,439 B1 | 11/2002 | Bernaden, III et al. |
| 6,480,889 B1 | 11/2002 | Saito et al. |
| 6,486,778 B2 | 11/2002 | Mahler et al. |
| 6,594,554 B1 | 7/2003 | Seem et al. |
| 6,759,956 B2 | 7/2004 | Menard et al. |
| 6,816,811 B2 | 11/2004 | Seem |
| 6,826,607 B1 | 11/2004 | Gelvin et al. |
| 6,829,513 B2 | 12/2004 | Piersanti et al. |
| 6,842,430 B1 | 1/2005 | Melnik |
| 6,862,540 B1 | 3/2005 | Welch et al. |
| 6,874,691 B1 | 4/2005 | Hildebrand et al. |
| 6,916,239 B2 | 7/2005 | Siddaramanna et al. |
| 6,937,909 B2 | 8/2005 | Seem |
| 7,031,880 B1 | 4/2006 | Seem et al. |
| 7,053,767 B2 | 5/2006 | Petite et al. |
| 7,053,770 B2 | 5/2006 | Ratiu et al. |
| 7,089,089 B2 | 8/2006 | Cumming et al. |
| 7,103,511 B2 | 9/2006 | Petite |
| 7,124,637 B2 | 10/2006 | Singhal et al. |
| 7,132,757 B2 | 11/2006 | Steigerwald et al. |
| 7,148,803 B2 | 12/2006 | Bandy et al. |
| 7,170,201 B2 | 1/2007 | Hamel et al. |
| 7,176,601 B2 | 2/2007 | Tanaka et al. |
| 7,378,980 B2 | 5/2008 | McFarland |
| 7,379,390 B2 | 5/2008 | McFarland |
| 7,382,271 B2 | 6/2008 | McFarland |
| 7,406,300 B2 | 7/2008 | Pan |
| 7,468,661 B2 | 12/2008 | Petite et al. |
| 7,479,727 B1 | 1/2009 | Grace |
| 7,496,472 B2 | 2/2009 | Seem |
| 7,623,826 B2 | 11/2009 | Pergal |
| 7,660,892 B2 | 2/2010 | Choong et al. |
| 2002/0152298 A1 | 10/2002 | Kikta et al. |
| 2003/0101009 A1 | 5/2003 | Seem |
| 2003/0151513 A1 | 8/2003 | Herrmann et al. |
| 2003/0160693 A1 | 8/2003 | Hisano |
| 2003/0216837 A1 | 11/2003 | Reich et al. |
| 2004/0133314 A1 | 7/2004 | Ehlers et al. |
| 2004/0208152 A1 | 10/2004 | Perkins et al. |
| 2004/0233855 A1 | 11/2004 | Gutierrez et al. |
| 2004/0235468 A1 | 11/2004 | Luebke et al. |
| 2005/0101009 A1 | 5/2005 | Wilson et al. |
| 2005/0113943 A1 | 5/2005 | Nian |
| 2005/0226201 A1 | 10/2005 | McMillin |
| 2005/0231354 A1 | 10/2005 | Riedel et al. |
| 2005/0276233 A1 | 12/2005 | Shepard et al. |
| 2006/0007945 A1 | 1/2006 | Schoettle et al. |
| 2006/0056363 A1 | 3/2006 | Ratiu et al. |
| 2006/0056370 A1 | 3/2006 | Hancock et al. |
| 2006/0063522 A1 | 3/2006 | McFarland |
| 2006/0063523 A1 | 3/2006 | McFarland |
| 2006/0066455 A1 | 3/2006 | Hancock et al. |
| 2006/0071780 A1 | 4/2006 | McFarland |
| 2006/0073794 A1 | 4/2006 | Stortoni |
| 2006/0090467 A1 | 5/2006 | Crow |
| 2006/0095146 A1 | 5/2006 | Hesse et al. |
| 2006/0104197 A1 | 5/2006 | Proctor et al. |
| 2006/0182076 A1 | 8/2006 | Wang |
| 2006/0193262 A1 | 8/2006 | McSheffrey et al. |
| 2006/0245360 A1 | 11/2006 | Ensor et al. |
| 2006/0259285 A1 | 11/2006 | Bahel et al. |
| 2007/0097993 A1 | 5/2007 | Bojahra et al. |
| 2007/0191075 A1 | 8/2007 | Greene et al. |
| 2008/0179408 A1 | 7/2008 | Seem |
| 2008/0179409 A1 | 7/2008 | Seem |
| 2008/0198036 A1 | 8/2008 | Songkakul et al. |
| 2008/0277486 A1 | 11/2008 | Seem et al. |
| 2009/0040057 A1 | 2/2009 | Keyghobad et al. |
| 2009/0065596 A1 | 3/2009 | Seem et al. |
| 2009/0083583 A1 | 3/2009 | Seem et al. |
| 2009/0144023 A1 | 6/2009 | Seem |
| 2009/0156118 A1 | 6/2009 | Schadler |
| 2009/0307255 A1 | 12/2009 | Park |
| 2010/0135186 A1 | 6/2010 | Choong et al. |

FOREIGN PATENT DOCUMENTS

| | | |
|---|---|---|
| CA | 2125694 | 5/1994 |
| CN | 1291704 A | 4/2001 |
| DE | 693 11 314 T2 | 10/1997 |
| DE | 198 32 579 A1 | 3/1999 |
| DE | 100 38 233 A1 | 2/2001 |
| DE | 698 08 393 T2 | 6/2003 |
| DE | 1020040 32 050 A1 | 3/2005 |
| EP | 0 628 181 B1 | 6/1997 |
| EP | 1 072 847 A2 | 1/2001 |
| EP | 0 892 330 B1 | 10/2002 |
| EP | 1 300 771 A2 | 4/2003 |
| EP | 1 309 062 A2 | 5/2003 |
| JP | 11224101 A | 8/1999 |
| JP | 2000502789 T | 3/2000 |
| JP | 2001-050599 A | 2/2001 |
| JP | 2001-082786 A | 3/2001 |
| JP | 03-242881 B2 | 12/2001 |
| JP | 03-358661 B2 | 12/2002 |
| JP | 03-370673 B2 | 1/2003 |
| JP | 2003-162324 A | 6/2003 |
| JP | 2003-242212 A | 8/2003 |
| JP | 2005-044349 A | 2/2005 |
| SU | 535103 A | 11/1976 |
| WO | WO 95/30114 A1 | 11/1995 |
| WO | WO 97/29329 A2 | 8/1997 |
| WO | WO 00/68744 A1 | 11/2000 |
| WO | WO 2009/012269 A2 | 1/2009 |
| WO | WO 2009/012282 A2 | 1/2009 |
| WO | WO 2009/018215 A1 | 2/2009 |

OTHER PUBLICATIONS

Office Action for U.S. Appl. No. 12/181,265, dated Feb. 15, 2011, 10 pages.

Bristol, E. 1966. "On a New Measure of Interaction for Multivariable Process Control". IEEE Transactions on Automatic Control. AC-11, 133-134.

Marlin, T. 2000. "Process Control: Designing Processes and Control Systems for Dynamic Performance—2nd Edition". Published by McGraw-Hill.

Office Action for U.S. Appl. No. 12/670,832, dated Jan. 13, 2012, 7 pages.

Office Action for U.S. Appl. No. 12/181,265, dated Aug. 5, 2011, 11 pages.

Aamodt, Application Note AN042 (Rev. 1.0) SWRA095, Chipcon Products from Texas Instruments, CC2431 Location Engine, 2006. 20 pages.

ASHRAE. ANSI/SHRAE Standard 62.1-2004, Ventilation for Acceptable Indoor Air Quality, Atlanta, American Society of Heating, Refrigerating and Air Conditioning Engineers, 2004, 52 pages.

ASHRAE. 2005 ASHRAE Handbook Fundamentals SI Edition. Atlanta, Georgia, American Society of Heating, Refrigerating and Air Conditioning Engineers, 2005, 62 pages.

Best Vacuum Inc., Decentralized Airborne Infection Control in Health-Care Facilities, IQAir, Press Release, Mar. 2002, 3 pages.

Bristol, On a New Measure of Interaction for Multivariable Process Control, IEEE Transactions on Automatic Control, 1966, vol. 11, Issue 1, pp. 133-134.

Castelvecchi, Wireless Energy May Power Electronics: Dead Cell Phone Inspired Research Innovation, TechTalk, Serving the MIT Community, vol. 15, No. 9, Nov. 15, 2006, 8 pages.

Churchill et al., Strain Energy Harvesting for Wireless Sensor Networks, Microstrain Inc., Smart Structures and Materials, vol. 5055, 2003, 9 pages.

Fountain et al., Comfort Control for Short-Term Occupancy, Energy and Buildings, vol. 21, No. 1, 1994, 15 pages.

Glicksman et al., Thermal and Behavioral Modeling of Occupant-Controlled Heating, Ventilation and Air Conditioning Systems, Energy and Buildings, vol. 25, No. 3, 1997, pp. 243-249.

Hashimoto et al., People-Counting System Using Multisensing Application, Sensors and Actuators A: Physical, vol. 66, Issues 1-3, Apr. 1, 1998, pp. 50-55.

Hosni et al., Experimental Results for Heat Gain and Radiant/Convective Split from Equipment in Buildings, ASHRAE Transactions, Seattle, Washington, 1999, 13 pages.

International Search Report and Written Opinion for International Patent Application No. PCT/US2008/070091, mail date Sep. 30, 2009, 10 pages.

International Search Report and Written Opinion for International Patent Application No. PCT/US2008/071354, mail date Nov. 13, 2008, 9 pages.

Kannan Ramachandran, Srividya, Establishing a Regulatory Framework for Distributed Antenna Systems, Telecommunications Policy Research Conference 2008, available at SSRN: http://ssm.com/abstract=1161209, Jul. 15, 2008, 77 pages.

Karalis et al., Wireless Non-Radiative Energy Transfer, Center for Materials Science and Engineering and Research Laboratory of Electronics, MIT, 17 pages.

Katz, Residential Piezoelectric Energy Sources, Technical Report, Delta Smart House, taken from http://web.archive.org/web/20070204055852/http://www.smarthome.duke.edu/downloads/piezoelectrics_andrew.doc, believed to be available by at least Jul. 21, 2004, 7 pages.

Kaushal et al., Environmental Control Including Ventilation in Hospitals, JK Science, Hospital Notes, vol. 6, No. 4, Oct.-Dec. 2004, pp. 229-232.

Kulkarni et al., Energy Optimal Control of a Residential Space-Conditioning System Based on Sensible Heat Transfer Modeling, Building and Environment, vol. 39, No. 1, 2004, pp. 31-38.

Lowton et al., Finding NEMO: On the Accuracy of Inferring Location in IEEE 802.15.4 Networks, REALWSN'06, Jun. 19, 2006, Uppsala, Sweden, 5 pages.

McQuiston et al., Heating, Ventilating and Air Conditioning: Analysis and Design, 6th Edition, 2005, 42 pages.

Office Action for U.S. Appl. No. 11/801,143 mailed Mar. 31, 2010, 28 pages.

Rice et al., An Evaluation of Hospital Special-Ventilation-Room Pressures, Infection Control and Hospital Epidemiology, vol. 22, No. 1, University of Minnesota, Minneapolis, Minnesota, Jan. 2001, pp. 19-23.

Stratton, Occupationally Acquired Infections: A Timely Reminder, Infection Control and Hospital Epidemiology, vol. 22, No. 1, Vanderbilt University School of Medicine, Nashville, Tennessee, Jan. 2001, pp. 8-9.

Takeuchi et al., P6F-2 Piezoelectric Generator as Power Supply for RFID-Tags and Applications, Ultrasonics Symposium, IEEE, Oct. 1, 2007, pp. 2558-2561.

Thomas et al., Feed-Forward in Temperature Control of Buildings, Energy and Buildings, vol. 37, No. 7, 2005, pp. 755-761.

Wireless Energy Transfer May Power Devices at a Distance, Scientific American, Nov. 14, 2006, 2 pages.

Controller ID Tag

| Sensor ID Tag | FEC 1 | FEC 2 | FEC 3 | FEC 4 | FEC 5 | ... |
|---|---|---|---|---|---|---|
| Sensor A | -61 | -72 | -72 | -85 | -85 | |
| Sensor B | -68 | -71 | -54 | -64 | -74 | |
| Sensor C | -85 | -83 | -82 | -74 | -67 | |
| Sensor D | -70 | -64 | -57 | -79 | -85 | |
| Sensor E | -41 | -44 | -60 | -81 | -85 | |
| Sensor F | -58 | -60 | -65 | -85 | -84 | |
| Sensor G | -29 | -50 | -60 | -73 | -80 | |
| Sensor H | -55 | -57 | -43 | -81 | -72 | |
| Sensor I | -65 | -75 | -62 | -67 | -77 | |
| Sensor J | -75 | -80 | -59 | -50 | -59 | |
| Sensor K | NA | NA | -85 | -53 | -57 | |
| Sensor L | -85 | -85 | -76 | -59 | -64 | |
| Sensor M | -84 | -85 | -81 | -57 | -72 | |
| Sensor N | -85 | -85 | -75 | -55 | -74 | |
| Sensor O | NA | -85 | -85 | -62 | -40 | |
| Sensor P | NA | NA | -85 | -69 | -64 | |

Controller ID Tag

| Sensor ID Tag | FEC 1 | FEC 2 | FEC 3 | FEC 4 | FEC 5 | ... |
|---|---|---|---|---|---|---|
| Sensor A | 0.00 | 0.00 | 0.00 | 0.00 | 0.00 | |
| Sensor B | 0.00 | 0.00 | 0.00 | 0.00 | 0.00 | |
| Sensor C | 0.00 | 0.00 | 0.00 | 0.00 | 0.00 | |
| Sensor D | 0.00 | 0.00 | 0.00 | 0.00 | 0.00 | |
| Sensor E | -0.02 | 1.02 | 0.00 | 0.00 | 0.00 | |
| Sensor F | 0.00 | 0.00 | 0.00 | 0.00 | 0.00 | |
| Sensor G | 1.02 | 0.00 | 0.00 | 0.00 | 0.00 | |
| Sensor H | 0.00 | 0.00 | 1.00 | 0.00 | 0.00 | |
| Sensor I | 0.00 | 0.00 | 0.00 | -0.21 | 0.00 | |
| Sensor J | 0.00 | 0.00 | 0.00 | 1.01 | 0.00 | |
| Sensor K | 0.00 | 0.00 | 0.00 | 0.00 | 0.00 | |
| Sensor L | 0.00 | 0.00 | 0.00 | -0.14 | 0.00 | |
| Sensor M | 0.00 | 0.00 | 0.00 | 0.00 | 0.00 | |
| Sensor N | 0.00 | 0.00 | 0.00 | 0.30 | 0.00 | |
| Sensor O | 0.00 | 0.00 | 0.00 | 0.00 | 1.00 | |
| Sensor P | 0.00 | 0.00 | 0.00 | 0.00 | 0.00 | |

PAIRING WIRELESS DEVICES OF A NETWORK USING RELATIVE GAIN ARRAYS

CROSS-REFERENCE TO RELATED APPLICATIONS

The present application claims the benefit of U.S. Provisional Patent Application No. 60/962,697, filed Jul. 31, 2007, the entire disclosure of which is incorporated by reference.

BACKGROUND

The present disclosure relates generally to the field of building management systems. More specifically, the present disclosure relates to the field of wireless building management systems.

Wireless control systems in building management can eliminate wiring costs and speed up installation processes. Further, wireless control systems can be more easily adapted when spaces in the buildings are reconfigured. A common setup in building management is to have wireless temperature sensors (e.g., thermostats) transmit room temperatures to one or more controllers that operate vents or other HVAC devices. A large building may have many wireless thermostats. However, it can be time consuming to ensure that each thermostat is coupled to the correct controller(s). The coupling exercise, commonly known as "pairing", is typically carried out manually based on visual checks and design specifications.

Applicants have found that there is a need a new control systems, devices, and methods for pairing wireless devices of a building. Further, Applicants have found that there is need for wireless devices that are adaptive to spatial changes and network changes.

SUMMARY

The invention relates a method for pairing a first wireless device with a second wireless device. The method includes gathering a first wireless communications characteristic about communications between the first wireless device and the second wireless device. The method further includes gathering second wireless communications characteristics about communications between the first wireless device and at least one wireless device other than the second wireless device. The method also includes generating a matrix using the first and second wireless communications characteristics. The method yet further includes generating a relative gain array from the matrix and computing the pairing between the first wireless device and the second wireless device using the generated relative gain array. The method then includes configuring at least one of the first wireless device and the second wireless device based on the computed pairing.

The invention further relates to a controller for pairing a first wireless device with a second wireless device. The controller includes a communications interface and a processing circuit. The processing circuit is configured to use the communications interface to gather a first wireless communications characteristic about communications between the first wireless device and the second wireless device. The processing circuit is also configured to gather a second wireless communications characteristic about communications between the first wireless device and wireless devices other than the second wireless device. The processing circuit is configured to generate a matrix using the first and second wireless communications characteristics. The processing circuit is yet further configured to use the matrix to generate a relative gain array and to compute the pairing between the first wireless device and the second wireless device using the generated relative gain array. The processing circuit is yet further configured to cause the pairing to be sent to at least one of a memory device local to the controller, the first wireless device via the communications interface, and the second wireless device via the communications interface.

The invention also relates to a computer readable medium storing program code for causing a controller to pair nodes of a network. The computer readable medium includes program code for gathering wireless communications characteristics of communications between the nodes of the network. The computer readable medium further includes program code for generating a relative gain array of the wireless communications characteristics of the communications between the nodes of the network. The computer readable medium further includes program code for making pairing determinations using the generated relative gain array. The computer readable medium yet further includes program code for configuring the nodes of the network using the pairing determinations.

The invention also relates to a server computer configured to provide program code to a client computer, the program code for causing the client computer to pair nodes of a network. The server computer includes a communications interface for communicating with the client computer. The server computer also includes a processing circuit for accessing a memory device storing the program code. The program code includes program code for gathering wireless communications characteristics of communications between the nodes of the network, program code for generating a relative gain array of the wireless communications characteristics of the communications between the nodes of the network, program code for making pairing determinations using the generated relative gain array, and program code for configuring the nodes of the network using the pairing determinations.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which:

FIG. 5A is a diagram of a table containing a matrix of recorded power level values in decibels for each potential pair of sensor and controller, according to an exemplary embodiment;

FIG. 5B is a diagram of a table showing the values of an RGA matrix generated by the process shown in FIG. 4, according to an exemplary embodiment;

DETAILED DESCRIPTION OF THE EXEMPLARY EMBODIMENTS

Before turning to the figures which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for pairing wireless building automation system devices using indicia of radio frequency (RF) strength measures is shown. More particularly, a relative gain array is computed using RF signal strength measurements. The resulting relative gain array is used by a pairing routine to estimate appropriate device-to-device pairing.

Figure 1:
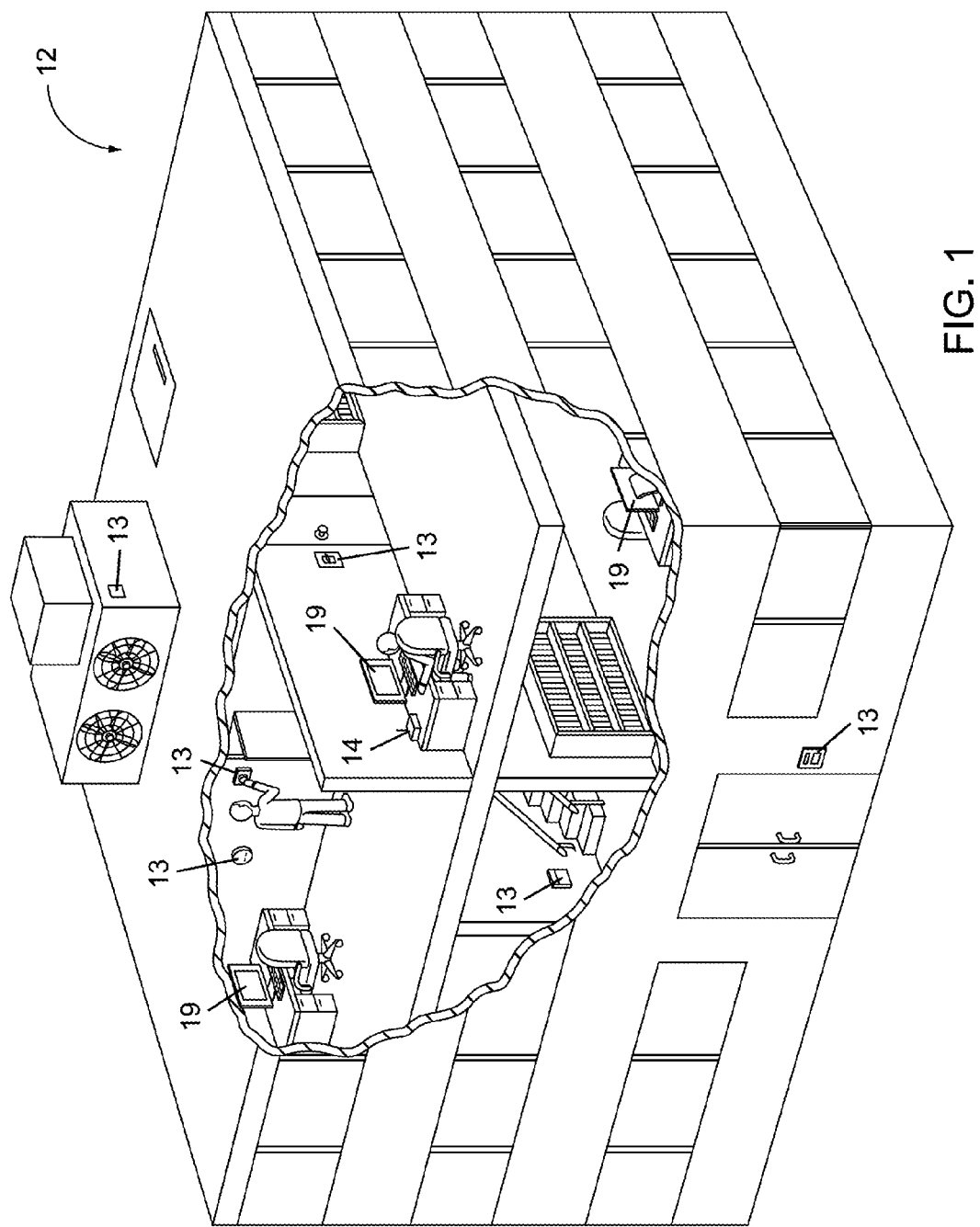
FIG. 1 is a perspective view of a building having a plurality of RF-enabled devices, according to an exemplary embodiment.

FIG. 1 is a perspective view of a building 12 having a plurality of devices (e.g., RF-enabled devices 13) capable of transmitting and/or receiving signals (e.g., RF signals), according to an exemplary embodiment. Building 12 may include any number of floors, rooms, spaces, zones, and/or other building structures and areas. According to various exemplary embodiments, building 12 may be any area of any size or type, including an outdoor area. RF-enabled devices 13 may exist inside or outside the building, on walls or on desks, and be user interactive or not. As examples, RF-enabled devices 13 may be security devices, light switches, fan actuators, temperature sensors, thermostats, smoke detectors, occupancy sensors, other various types of sensors (flow, pressure, etc.), communications devices, network devices, etc. RF-enabled devices 13 may be configured to conduct building automation functions (e.g., sense temperature, sense humidity, control a building automation device, etc.). RF-enabled devices 13 may also serve any number of network functions (e.g., RF measuring functions, network routing functions, etc.). A controller system 14 is shown as a desktop wireless device. Controller system 14 may serve as a network coordinator, wireless access point, router, switch, or hub, and/or serve as another node on a network. A workstation 19 is shown as a personal workstation. Workstation 19 may allow building engineers to interact with controller system 14. RF-enabled devices 13 may be connected to controller system 14 and/or workstations 19 via a wired and/or wireless connection.

A building automation system (BAS) is, in general, a hardware and/or software system configured to control, monitor, and manage equipment in or around a building or building area. BAS equipment can include a heating, ventilation, and air conditioning (HVAC) system, a security system, a lighting system, a fire alerting system, an elevator system, another system that is capable of managing building functions, or any combination thereof. The BAS as illustrated and discussed in this disclosure is an example of a building automation system that may be used in conjunction with the systems and methods of the present disclosure. However, other building automation systems may be used as well. According to other exemplary embodiments, the systems and methods of the present disclosure may be used in conjunction with any type of system (e.g., a general purpose office local area network (LAN), a home LAN, a wide area network (WAN), a wireless hotspot, etc.).

Figure 2:
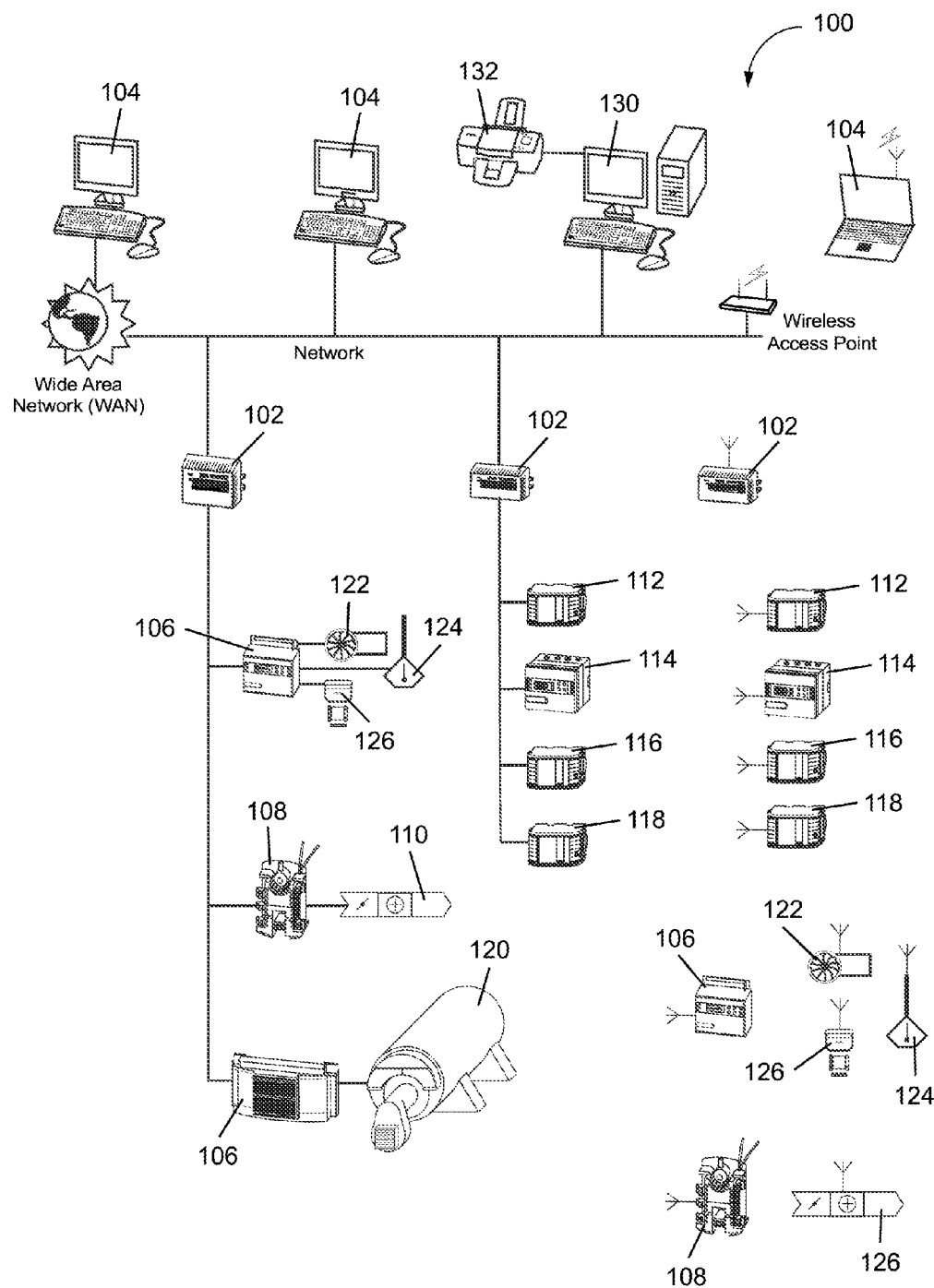
FIG. 2 is a schematic diagram of a building automation system for the building of FIG. 1, according to an exemplary embodiment.

Referring to FIG. 2, a schematic diagram of a BAS 100 that may be used with the systems and methods of the present disclosure is shown, according to an exemplary embodiment. BAS 100 may include one or more supervisory controllers (e.g., a network automation engine (NAE)) 102 connected to a proprietary or standard communications network such as an IP network (e.g., Ethernet, WiFi, ZigBee, Bluetooth, etc.). Supervisory controllers 102 may support various field-level communications protocols and/or technology, including various Internet Protocols (IP), BACnet over IP, BACnet Master-Slave/Token-Passing (MS/TP), N2 Bus, N2 over Ethernet, Wireless N2, LonWorks, ZigBee, and any number of other standard or proprietary field-level building management protocols and/or technologies. Supervisory controllers 102 may include varying levels of supervisory features and building management features. The user interface of supervisory controllers 102 may be accessed via terminals 104 (e.g., web browser terminals) capable of communicably connecting to and accessing supervisory controllers 102. For example, FIG. 2 shows multiple terminals 104 that may variously connect to supervisory controllers 102 or other devices of BAS 100. For example, terminals 104 may access BAS 100 and connected supervisory controllers 102 via a WAN, an Internet location, a local IP network, or via a connected wireless access point. Terminals 104 may also access BAS 100 and connect to supervisory controllers 102 to provide information to another source, such as printer 132.

Supervisory controllers 102 may be connected to any number of BAS devices. The devices may include, among other devices, devices such as field equipment controllers (FEC) 106, field-level control modules, variable air volume modular assemblies (VMAs) 108, integrator units, room controllers 110 and 112 (e.g., a variable air volume (VAV) device or unit such as a VAV box), other controllers 114, unitary devices 116, zone controllers 118 (e.g., an air handling unit (AHU) controller), boilers 120, fan coil units 122, heat pump units 124, unit ventilators 126, expansion modules, blowers, temperature sensors, flow transducers, other sensors, motion detectors, actuators, dampers, heaters, air conditioning units, etc. These devices may generally be controlled and/or monitored by supervisory controllers 102. Data generated by or available on the various devices that are directly or indirectly connected to supervisory controller 102 may be passed, sent, requested, or read by supervisory controller 102 and/or sent to various other systems or terminals 104 of BAS 100. The data may be stored by supervisory controller 102, processed by supervisory controller 102, transformed by supervisory controller 102, and/or sent to various other systems or terminals 104 of the BAS 100. As shown in FIG. 2, the various devices of BAS 100 may be connected to supervisory controller 102 with a wired connection or with a wireless connection.

Still referring to FIG. 2, an enterprise server 130 (e.g., an application and data server (ADS)) is shown, according to an exemplary embodiment. Enterprise server 130 is a server system that includes a database management system (e.g., a relational database management system, Microsoft SQL Server, SQL Server Express, etc.) and server software (e.g., web server software, application server software, virtual machine runtime environments, etc.) that provide access to data and route commands to BAS 100. For example, enterprise server 130 may serve user interface applications. Enterprise server 130 may also serve applications such as Java applications, messaging applications, trending applications, database applications, etc. Enterprise server 130 may store trend data, audit trail messages, alarm messages, event messages, contact information, and/or any number of BAS-related data. Terminals may connect to enterprise server 130 to access the entire BAS 100 and historical data, trend data, alarm data, operator transactions, and any other data associated with BAS 100, its components, or applications. Various local devices such as printer 132 may be attached to components of BAS 100 such as enterprise server 130.

Referring to FIGS. 3A-3E, various wireless devices (e.g., BAS nodes such as sensors, field-level controllers, routers, local controllers, supervisory controllers, or otherwise) are shown. The wireless devices are a part of a self-configuring system configured to automatically pair the wireless devices to each other. The self-configuring system may include any number of devices (e.g., sensors, controllers, actuators, etc.). Each device or some of the devices may include a relationship engine. A relationship engine includes logic for automatically defining, calculating, and/or determining relationships between the various devices. The logic may include using RF data to define the relationships. According to some exemplary embodiments, RF step test signals between devices may also be used to define the relationships between devices. Each device includes an RF transceiver configured for wireless data communications. According to other exemplary embodiments, some devices are coupled via a wired connection to another device having the RF transceiver for wireless data communications. Each device may further include an environment data processing system for sensing various building properties or conditions (e.g., temperature, humidity, occupancy, air flow rate, brightness, etc.).

Figure 3A:
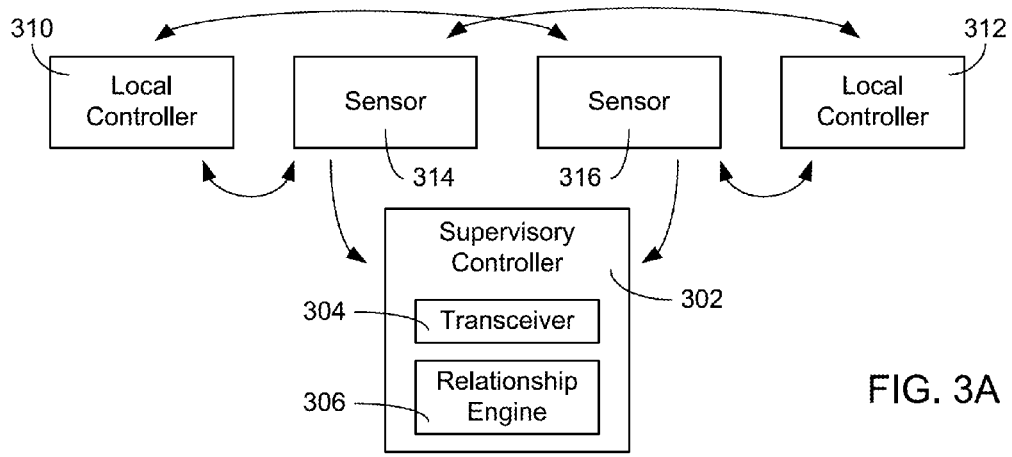
FIG. 3A is a block diagram of a supervisory controller configured to assign relationships between sensors and controllers, according to an exemplary embodiment.

Referring now to FIG. 3A, supervisory controller 302 is shown to include transceiver 304 and relationship engine 306, according to an exemplary embodiment. Two local controllers 310, 312 (which may or may not also include transceivers and relationship engines) are shown communicating with sensors 314, 316. Sensors 314, 316 may communicate with local controllers 310, 312 and determine signal strength data regarding the communications. Particularly, either sensors 314, 316 or local controllers 310, 312 can initiate the communications. The initiator may be the device seeking to be paired. For example, if sensor 314 is not paired, it can begin a pairing routine that includes sending a request for local controllers 310, 312 to send sensor 314 one or more test signals. Local controllers 310, 312 can then transmit the test signals for reception by sensor 314. Sensor 314 can conduct any number of analysis steps on the received test signals and/or compile data regarding the test signals in a memory device. For example, sensor 314 may compile signal strength data about the communications between itself and local controllers 310, 312. Sensor 316 may conduct the same activity. Any data regarding the communications between the sensors and the controllers can be forwarded by the sensors (or the local controllers) to supervisory controller 302. Relationship engine 306 of supervisory controller 302 can analyze the communications data to determine optimal pairings between local controllers 310, 312 and sensors 314, 316. While only two sensors and two controllers are shown with reference to FIG. 3A, any number of sensors and controllers (and/or communications therebetween) can be analyzed by supervisory controller 302.

Figure 3B:
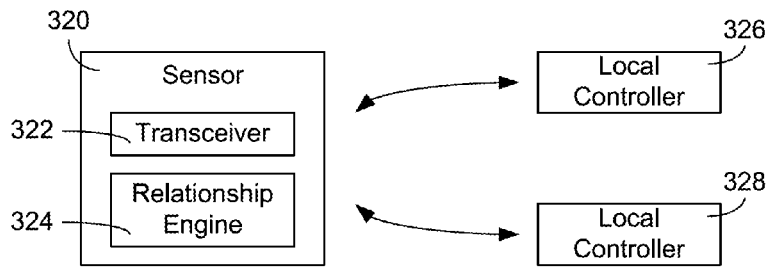
FIG. 3B is a block diagram of a sensor configured to assign one or more relationships between itself and controllers, according to an exemplary embodiment.

Referring now to FIG. 3B, an exemplary embodiment is shown to include sensor 320 having self configuration circuitry (e.g., relationship engine 324). Sensor 320 may wirelessly communicate with multiple local controllers (e.g., controllers 326, 328) using transceiver 322. Sensor 320 may determine signal strength information regarding communications to and/or from each of the multiple local controllers 326, 328 using transceiver 322 and relationship engine 324. The signal strength information can be used by sensor 320 to determine an optimal local controller with which to pair.

Figure 3C:
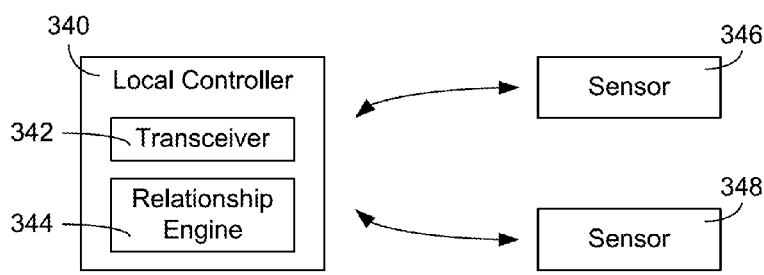
FIG. 3C is a block diagram of a local controller configured to assign relationships between itself and one or more sensors, according to an exemplary embodiment.

Referring now to FIG. 3C, an exemplary embodiment is shown to include local controller 340 having self configuration circuitry (e.g., relationship engine 344). Local controller 340 may wirelessly communicate with multiple sensors (e.g., sensors 346, 348) using transceiver 342. Local controller 340 may determine signal strength information regarding communications to and/or from each of the multiple sensors 346, 348. Relationship engine 344 may use the signal strength information to pair local controller 340 with an optimal sensor or sensors.

Figure 3D:
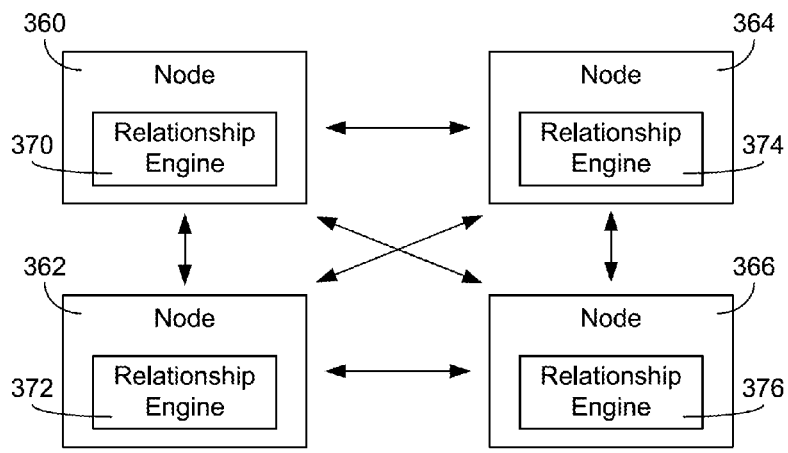
FIG. 3D is a block diagram of nodes configured to assign relationships between themselves, according to an exemplary embodiment.

Referring now to FIG. 3D, an exemplary embodiment is shown to include multiple wireless nodes 360, 362, 364, 366, each of the multiple nodes having self configuration circuitry. Nodes 360-366 may be sensors, local or supervisory controllers, or any other wireless device (e.g., RF devices 13 shown in FIG. 1). Nodes 360-366 may communicate with each of the other nodes or only a subset of the other nodes. Nodes 360-366 include relationship engines 370, 372, 374, 376. Relationship engines 370-376 may collect signal strength information regarding communications between itself and all of its neighboring nodes, and may determine an optimal pairing with another node. Nodes 360-366 may be configured to dynamically adjust pairings based on an optimal pairing periodically determined by each individual node.

Figure 3E:
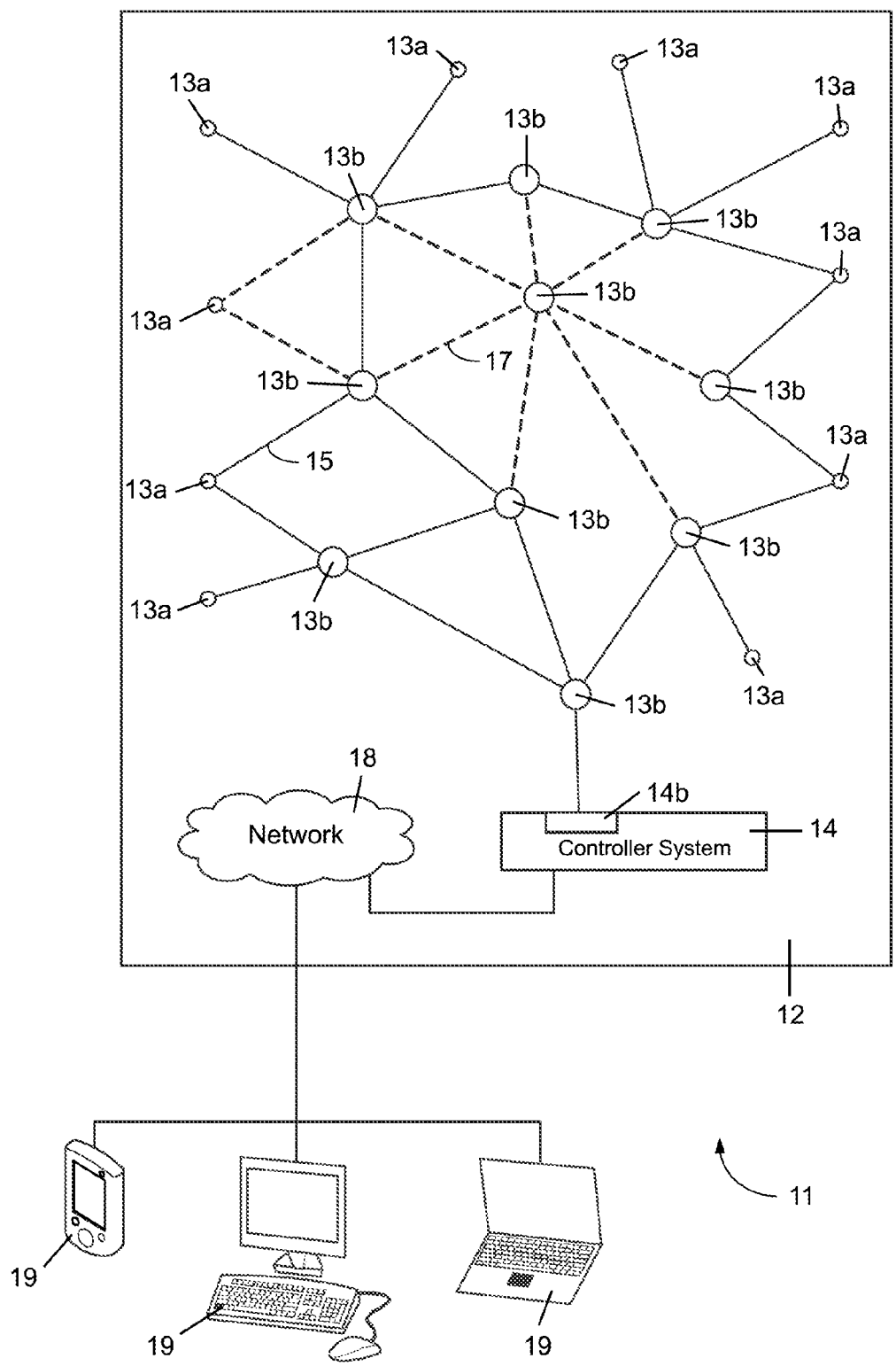
FIG. 3E is a block diagram of a mesh network formed by the nodes of FIG. 3D, according to an exemplary embodiment.

FIG. 3E is a block diagram of a mesh network 11, according to an exemplary embodiment. A mesh network is an example of a network topology formed by the devices of the systems and methods as described within the disclosure (e.g., by the nodes of FIG. 3D). According to other exemplary embodiments, the devices may be arranged in another type of network topology.

In the illustrated embodiment, mesh network 11 includes a building area 12, a plurality of wireless devices 13a and 13b (and/or other devices and nodes), a controller system 14, a network 18, and various possible workstations 19 (e.g., a desktop computer, a personal digital assistant (PDA), a laptop, etc.). Wireless devices 13a and 13b are interconnected by wireless connections 15 (displayed as solid lines on FIG. 3E). Wireless connections may be disabled (or otherwise unavailable) for various reasons (displayed as dashed lines on FIG. 3E) and are shown by connections 17. As a result, some wireless devices 13a (devices without a solid line connection as illustrated in FIG. 3E) may temporarily be disconnected from mesh network 11, but are configured to automatically connect (or reconnect) to another suitable device 13a within range. This reconnection and/or automatic connection activity can be based on the systems and methods described in the present application. Controller system 14 may be connected to workstation 19 via network 18 and may include station 14b for receiving input from the various devices 13a and 13b. As illustrated in FIGS. 3A-D, a variety of devices can conduct the configuration activities. For example, in the embodiment shown in FIG. 3E, controller system 14 (e.g., supervisory controller, head node, enterprise controller, etc.) can include circuitry and/or software configured to gather data regarding communications in the network and the analyze the data for pairing purposes.

According to various exemplary embodiments, configuration software (e.g., relationship engine) and/or pairing software can reside in a memory device and/or processing circuit of a computing device (e.g., a laptop, personal computer, PDA, etc.). The computing device can be connected via one or more networks (e.g., network 18 shown in FIG. 3E, directly to one of devices 13*a*, 13*b*, directly to controller system 14, via a wired connection, or via a wireless connection.

According to an exemplary embodiment, wireless devices 13*a* and 13*b* of FIG. 3E are ZigBee compatible devices. ZigBee is the name of a specification related to low cost and low power digital radios. The ZigBee specification describes a collection of high level communication protocols based on the IEEE 802.15.4 standard. A ZigBee compatible device is a device generally conforming to ZigBee specifications and capable of existing or communicating with a ZigBee network. In other exemplary embodiments, Wireless devices 13*a* and 13*b* could be any kind of radio frequency communicating wireless device including, but not limited to, Bluetooth devices and traditional 802.11 (Wi-Fi) based devices. According to an exemplary embodiment, wireless devices 13*a* and 13*b* may consist of any type of ZigBee device including ZigBee coordinators, ZigBee routers, ZigBee end devices, etc. ZigBee coordinators and routers are generally RF-enabled devices that can act as intermediate routers and may relay data to and from other wireless devices on the network. The devices are sometimes referred to as full function devices. Conversely, ZigBee end devices may not be able to relay data from other devices back onto the network. These devices are sometimes referred to as reduced function devices. Mesh network 11 may include a number of wireless devices 13*a* and 13*b* that are either full function devices or reduced function devices. For example, wireless devices 13*a* that might be end devices or reduced function devices are shown with one connection (and may only have one possible connection) in mesh network 11. Additionally, wireless devices 13*b* might be coordinators, routers or full function devices that relay information to and from multiple wireless devices 13*a* and 13*b* on mesh network 11 (illustrated by a node with multiple connections). The devices 13*a* and 13*b* may be configured to determine a shortest path or otherwise exemplary path in which to send data on mesh network 11.

Figure 4:
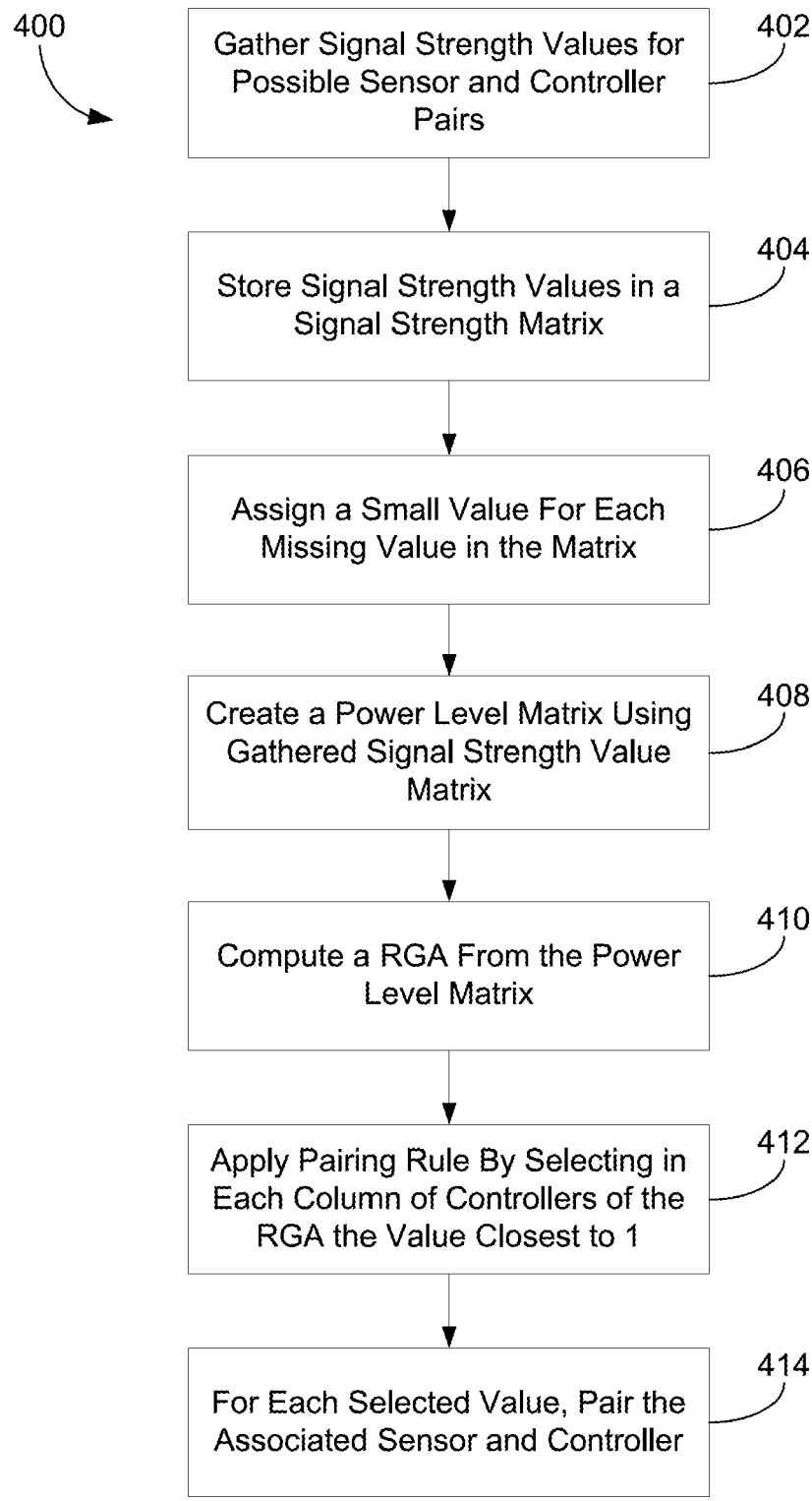
FIG. 4 is a flow chart of a process for pairing RF-enabled devices such as wireless sensors with other wireless nodes such as controllers, according to an exemplary embodiment.

Referring to generally FIG. 4, a process 400 for pairing wireless devices using gathered wireless communications characteristics is shown, according to an exemplary embodiment. Process 400 involves constructing a matrix of "gains" (e.g., steady state gains, dynamic gains, etc.) using a wireless communications characteristic such as signal strength between all devices of a possible wireless network (or a portion of a network). The constructed matrix of gains is then transformed into and/or otherwise used to calculate a relative gain array (RGA) matrix. A pairing decision or recommendation is then generated by analyzing the resulting RGA matrix.

According to many of the exemplary embodiments described in the present application, the pairing and the RGA are based on the wireless communications characteristic of signal strength. According to other exemplary embodiments, the wireless communications characteristic(s) is an indicia of a signal strength measurement that is adjusted based on range information and/or noise levels of the signals. According to yet other exemplary embodiments, the wireless communications characteristics may be a computed indicia of signal quality determined by a weighting function or other computation. The computation can consider, for example, signal strength, signal to noise ratio, estimated distance between nodes, node characteristics such as power output capability, the function of the device, knowledge regarding the location of the device, knowledge regarding neighboring devices, and any other information, characteristics, or parameters relating to communications between devices. According to various exemplary embodiments, a wireless communications characteristic is any measured or calculated value derived from one or more wireless communications signals passed between (e.g., to, from, to and from, etc.) wireless devices.

FIG. 4 illustrates an exemplary embodiment of process 400 utilizing signal strength measurements as the wireless communications characteristic used to determine device pairs. Process 400 is shown to include gathering signal strength values, in decibels (dB) or another measure of signal strength, for each possible device (e.g., sensor and controller) pair (step 402). The signal strength values may be obtained in various ways (e.g., via the systems described in FIGS. 3A-E). The gathered signal strength values may be stored in a signal strength matrix (step 404) or another data structure.

FIG. 5A illustrates a possible signal strength matrix 500 that may be generated by process 400 (e.g., by steps 402 and 404), where each data field of matrix 500 represents an indicator of signal strength between a sensor and a controller. As shown in FIG. 5A, for example, a signal strength level of −85 dB is shown to exist between controller (receiver) "FEC 5" and sensor "Sensor A." Matrix 500 shows recorded signal strength values in decibels for each potential pair of sensor and controller.

Referring further to process 400 of FIG. 4, there may not be a gathered signal strength value for all possible device pairs. In order to obtain a full matrix, a small filler value for all such instances may be filled in into matrix 500 (step 406). The filler value might be a number close to 0. According to an exemplary embodiment, the filler value can be set to be a positive number smaller than the minimum finite reading in matrix 500. For example, the filler value may be set at 10% below the minimum value in matrix 500.

Referring still to process 400 of FIG. 4, the signal strength values are converted into power levels. For example, the signal strength values, in decibels, in matrix 500 of FIG. 5 are converted to power levels. According to an exemplary embodiment, the conversion is made by applying the mathematical formula $$p_{ij} = 10^{\frac{d_{ij}}{10}},$$

where $d_{ij}$ denotes the decibel value of the signal strength between sensor i and controller j (row i, column j) in matrix 600, and where $p_{ij}$ is the value stored in the power level matrix. According to various exemplary embodiments, a power level matrix is initially constructed by applying $$p = 10^{\frac{d}{10}}$$

as signal strength values are gathered in step 402.

After transforming signal strength measurements into power values, the resulting power level matrix P is generated and/or stored in memory (step 408). Process 400 then includes the step of computing a relative gain array (RGA)

from the power level matrix (step 410). According to an exemplary embodiment, the calculation used to create the RGA is:

$$RGA = P \cdot (P^{-1})^T.$$

The RGA matrix 550 of FIG. 5B shows the values determined in step 410 for a variety of sensor to controller pairings. The symbol · refers to the element-wise multiplication of two matrices (e.g., Hadamard multiplication). According to an exemplary embodiment, signal strength measurements are used (or indicia of signal strength measurements) to populate the RGA rather than the steady state gains typically associated with RGAs.

According to an exemplary embodiment, an RGA is an array based on the comparison of all possible input-output pairs. Any given element of an RGA represents a ratio of a measure of a relationship parameter between an input-output variable pair and an idealization based on how either the input or the output device relates to other devices.

Referring still to process 400 of FIG. 4, a pairing rule is then applied to the RGA (step 412). According to one exemplary embodiment, the pairing rule may include selecting, for each column, the value closest to one. The sensor and controller corresponding to the value are then paired (step 414).

Depending on the topology of the network, more than one "pairing" may be selected for each sensor and/or controller. For example, if each controller is configured to control up to four sensors, hardware circuitry and/or software logic can be configured to determine the best controller for each sensor until any given controller has four assigned sensors. The circuitry and/or logic can also be configured to find a new pairing for a first sensor if a second sensor is better suited for the controller having limited capacity. For example, in cases where "incorrect" pairings are selected and are later detected by the same or another method (e.g., a manual "checkup," an automated process, etc.), a correction may be made to the original selection by selecting the element with the second largest value for each column or row, pairing the sensor identified by the row ID of the selected element with the controller identified by the column ID of the selected element.

The results of pairing rule step 412 can be communicated to the relevant sensors and/or controllers and stored in memory devices of the sensors and/or controllers. For example, each sensor may include a table in memory configured to list the sensor's preferred communications path (e.g., preferred neighboring node with which to communicate, preferred controller, configured controller, etc.). The sensor can be configured to recognize pairing information communicated to it by the system conducting process 400 and to update its table based on the new pairing information. Supervisory controllers, enterprise controllers, local controllers, BAS databases, and or other memory devices can also be updated with any determined pairing information.

In exemplary RGA matrix 550 shown in FIG. 5B, sensor to controller pairings determined by process 400 are shown with a bold RGA value. Matrix 550 can be stored in any related memory device, shown on a computer display, e-mailed, printed, or otherwise used to communicate the suggested/determined pairing information to one or more users. For example, a web-based configuration utility can be configured to log into the controller executing process 400. The controller can include a web service configured to display matrix 550 to the user. Using such a display, the user can diagnose and configure the system. For example, field 560 can be shown with shading to indicate the present pairing (e.g., determined by the same or another activity as the activity described in the present application, determined manually by an installer, determined based on line-of-sight, etc.). The user (and/or an automated process) can evaluate why the suggested pairing in field 562 differs from the present pairing shown in field 560. Further, rather than providing all the pairings out to the network (resulting in unnecessary processing by the nodes of the system), only those pairings that differ from the present pairings might be provided to transceivers and/or memory devices of the relevant sensors and/or controllers.

Although the exemplary embodiments illustrated in FIGS. 5A-5B show sixteen pairs of sensors and controllers in an indoor environment, it should be understood that the embodiments illustrated in the present application are offered by way of example only. Accordingly, this application is not limited to any number of sensors or controllers that may be used, and the numbers of sensors and controllers need not be equal.

Figure 6A:
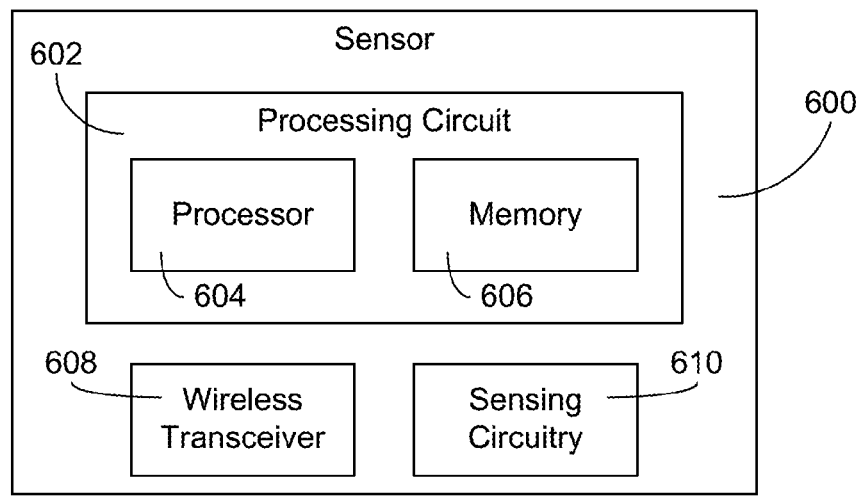
FIG. 6A is a block diagram of an RF-enabled device such as a sensor configured for use with the systems and methods of the present application, according to an exemplary embodiment.

Referring to FIG. 6A, a block diagram of a sensor 600 is shown, according to an exemplary embodiment. Sensor 600 is shown to include a processing circuit 602, a wireless transceiver 608, and a sensing circuitry 610. Processing circuit 602 is shown to include processor 604 and memory 606. According to various exemplary embodiments, processing circuit 602 may be a general purpose processor, an application specific processor (ASIC), a circuit containing one or more processing components, or any other processing circuit configured to facilitate the activities described herein using any combination of hardware and/or software components.

Figure 6B:
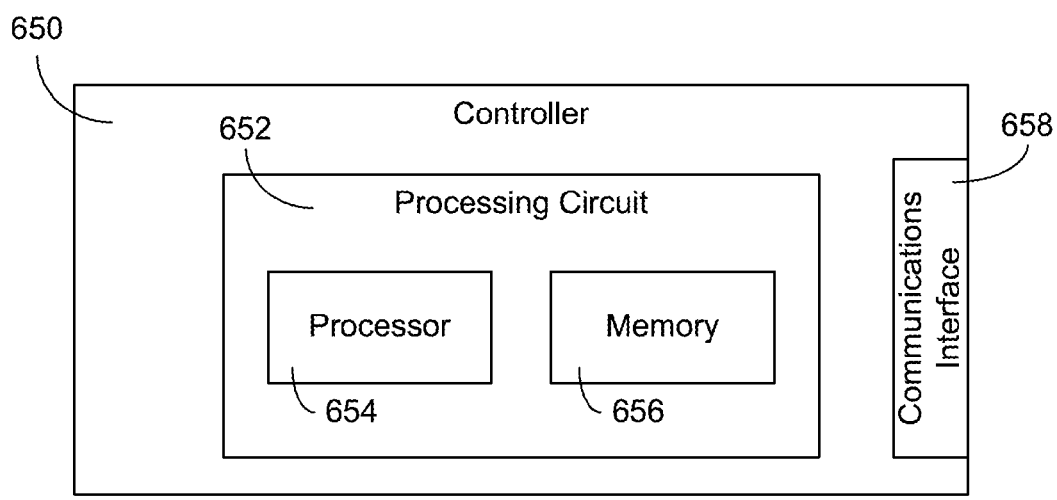
FIG. 6B is a block diagram of a controller such as a BAS controller configured for use with the systems and methods of the present application, according to an exemplary embodiment.

Referring to FIG. 6B, a block diagram of controller 650 is shown, according to an exemplary embodiment. Controller 650 includes a processing circuit 652. Processing circuit is shown to include processor 654 and memory 656. According to various exemplary embodiments, processing circuit 652 may be a general purpose processor, an application specific processor (ASIC), a circuit containing one or more processing components, or any other processing circuit configured to facilitate the activities described herein using any combination of hardware and software components.

In an exemplary embodiment, referring to FIG. 6B, controller 650 further includes a communication interface 658 configured to establish a communication link with a remote source. Communications interface 658 can be configured to communicate with any device or network connected to sensor 600. Communications interface 658 can be a wired interface or a wireless interface. For example, controller 650 can gather communications characteristics for a wireless portion of the network although controller 650 is wired to a wired portion of the same or another network. Controller 650 can be a server computer such as an application data server or an enterprise server. Communications interface 650 can also be a wireless communications interface having any suitable configuration and/or supporting any suitable protocol (e.g., RF, infrared, IEEE 802.15, IEEE 802.16, IEEE 802.11, a cellular phone protocol, a wireless USB protocol, or any other suitable wireless protocol).

Referring to FIGS. 6A-6B, memory 606 and 656 (e.g., memory unit, memory device, storage device, etc.) may be one or more devices for storing data and/or computer code for completing and/or facilitating the various processes described in the present disclosure. Memory 606 and 656 may include a volatile memory and/or a non-volatile memory. Volatile memory may be configured so that the contents stored therein may be erased during each power cycle of the system. Non-volatile memory may be configured so that the contents stored therein may be retained across power cycles, such that upon system power-up, data from previous system use remains available for the user. Memory 606 and 656 may include database components, object code components, script components, and/or any other type of information structure for supporting the various activities described in the present disclosure. According to an exemplary embodiment, any distributed and/or local memory device may be utilized with the systems and methods of this disclosure. According to an exemplary embodiment, memory 606 and 656 is communicably connected to processor 604 and 654 (e.g., via a circuit or other connection) and includes computer code for executing one or more processes described herein.

While the exemplary embodiments illustrated in the figures and described herein are presently preferred, it should be understood that the embodiments are offered by way of example only. Accordingly, the present disclosure is not limited to a particular embodiment, but extends to various modifications that nevertheless fall within the scope of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for pairing a first wireless device with a second wireless device, comprising:
    gathering a first wireless communications characteristic about communications between the first wireless device and the second wireless device;
    gathering second wireless communications characteristics about communications between the first wireless device and at least one wireless device other than the second wireless device;
    generating a matrix using the first and second wireless communications characteristics;
    generating a relative gain array from the matrix;
    computing the pairing between the first wireless device and the second wireless device using the generated relative gain array; and
    configuring at least one of the first wireless device and the second wireless device based on the computed pairing.

2. The method of claim 1, wherein the first and second wireless communications characteristic are signal strength measurements.

3. The method of claim 2, wherein generating the matrix using the first and second wireless communications characteristics comprises:
    creating a signal strength matrix;
    calculating power level values for each of the values in the signal strength matrix; and
    populating the matrix with the power level values.

4. The method of claim 3, wherein calculating power level values includes utilizing a decibel-to-power level conversion formula.

5. The method of claim 3, wherein computing the pairing between the first wireless device and the second wireless device using the generated relative gain array includes selecting device-to-device pairs having a relative gain array value closest to one.

6. The method of claim 1, wherein the first and second wireless communications characteristics are indicia of signal strength measurements and are adjusted based on one of a signal range and a noise level.

7. The method of claim 1, wherein the first and second wireless communications characteristics are a computed indicia of signal quality determined by a weighting function.

8. The method of claim 1, wherein configuring at least one of the first wireless device and the second wireless device based on the computed pairing comprises storing the address of the second wireless device in a memory device of the first wireless device or storing the address of the first wireless device in a memory device of the second wireless device.

9. The method of claim 1, wherein configuring the first wireless device and/or the second wireless device based on the computed pairing comprises storing the pairing in a memory device of a controller.

10. The method of claim 1, further comprising:
displaying a graphical representation of the relative gain array and indicia of the computed pairing on a computer display.

11. The method of claim 1, wherein the first wireless device is a sensor device for a building automation system.

12. The method of claim 11, wherein the second wireless device is a controller for a building automation system and is configured to control sensor devices such as the first wireless devices.

13. The method of claim 11, wherein the at least one wireless device other than the second wireless device and the first wireless device is building automation system device.

14. A controller for pairing a first wireless device with a second wireless device, the controller comprising:
a communications interface;
a processing circuit configured to use the communications interface to gather a first wireless communications characteristic about communications between the first wireless device and the second wireless device and configured to gather a second wireless communications characteristic about communications between the first wireless device and wireless devices other than the second wireless device, the processing circuit being configured to generate a matrix using the first and second wireless communications characteristics, the processing circuit configured to use the matrix to generate a relative gain array and to compute the pairing between the first wireless device and the second wireless device using the generated relative gain array, and wherein the processing circuit is configured to cause the pairing to be sent to at least one of a memory device local to the controller, the first wireless device via the communications interface, and the second wireless device via the communications interface.

15. The controller of claim 14, wherein the processing circuit is configured to generate the matrix using the first and second wireless communications characteristics by creating a signal strength matrix based on the gathered wireless communications characteristics, the processing circuit also configured to calculate power levels for values in the signal strength matrix, and wherein the processing circuit is configured to populate the matrix with the power level values.

16. The controller of claim 15, wherein the wireless communications characteristic and the wireless communications characteristics is at least one of a signal strength measurement and a value calculated based on a signal strength measurement; and wherein the communications interface one of a wired communications interface and a wireless communications interface.

17. The controller of claim 15, wherein the processing circuit is configured to utilize a decibel-to-power level conversion formula to calculate the power levels for values in the signal strength matrix.

18. The controller of claim 14, wherein computing the pairing between the first wireless device and the second wireless device using the generated relative gain array includes selecting device-to-device pairs having a relative gain array value closest to one.

19. A non-transitory computer readable medium storing program code for causing a controller to pair nodes of a network, the computer readable medium comprising:
program code for gathering wireless communications characteristics of communications between the nodes of the network;
program code for generating a matrix using the wireless communications characteristics of communications between the nodes of the network;
program code for generating a relative gain array of the wireless communications characteristics of the communications between the nodes of the network;
program code for making pairing determinations using the generated relative gain array; and
program code for configuring the nodes of the network using the pairing determinations.

20. A server computer configured to provide program code to a client computer, the program code for causing the client computer to pair nodes of a network, the server computer comprising:
a communications interface for communicating with the client computer;
and a processing circuit for accessing a memory device storing the program code, the program code comprising:
program code for gathering wireless communications characteristics of communications between the nodes of the network,
program code for generating a matrix using the wireless communications characteristics of communications between the nodes of the network,
program code for generating a relative gain array of the wireless communications characteristics of the communications between the nodes of the network,
program code for making pairing determinations using the generated relative gain array, and
program code for configuring the nodes of the network using the pairing determinations.

* * * * *